United States Patent
Johnson et al.

(10) Patent No.: US 7,009,388 B2
(45) Date of Patent: Mar. 7, 2006

(54) MAGNETIC POSITION SENSOR HAVING DUAL ELECTRONIC OUTPUTS

(75) Inventors: Gary W. Johnson, Huntington, IN (US); Todd Brown, Elkhart, IN (US)

(73) Assignee: Wabash Technologies, Inc., Huntington, IN (US)

(*) Notice: Subject to any disclaimer, the term of this patent is extended or adjusted under 35 U.S.C. 154(b) by 42 days.

(21) Appl. No.: 10/733,892

(22) Filed: Dec. 11, 2003

(65) Prior Publication Data

US 2005/0127900 A1 Jun. 16, 2005

(51) Int. Cl.
*G01B 7/14* (2006.01)
*G01B 7/30* (2006.01)

(52) U.S. Cl. .............................. 324/207.25; 324/207.24

(58) Field of Classification Search ............ 324/207.2, 324/207.21, 207.23, 207.24, 207.25, 207.26; 33/1 PT, 1 N
See application file for complete search history.

(56) References Cited

U.S. PATENT DOCUMENTS

| | | | |
|---|---|---|---|
| 4,810,965 A | | 3/1989 | Fujiwara et al. |
| 5,045,785 A | | 9/1991 | Hansen |
| 5,670,876 A | | 9/1997 | Dilger et al. |
| 5,793,201 A | | 8/1998 | Nelle et al. |
| 5,889,400 A | * | 3/1999 | Nakazawa ............... 324/207.2 |
| 5,955,881 A | | 9/1999 | White et al. |
| 6,057,682 A | | 5/2000 | McCurley et al. |
| 6,160,395 A | * | 12/2000 | Goetz et al. ............ 324/207.21 |
| 6,175,233 B1 | | 1/2001 | McCurley et al. |
| 6,215,299 B1 | | 4/2001 | Reynolds |
| 6,222,359 B1 | | 4/2001 | Duesler et al. |
| 6,268,722 B1 | * | 7/2001 | Kogure et al. ......... 324/207.25 |
| 6,304,078 B1 | | 10/2001 | Jarrard et al. |
| 6,310,473 B1 | | 10/2001 | Zhao |
| 6,316,936 B1 | | 11/2001 | Striker et al. |
| 6,414,482 B1 | * | 7/2002 | Mase ...................... 324/207.2 |
| 6,498,480 B1 | | 12/2002 | Manara |
| 6,646,435 B1 | * | 11/2003 | Nakamura et al. ..... 324/207.25 |
| 2001/0026154 A1 | | 10/2001 | Nekado |
| 2001/0035749 A1 | | 11/2001 | Nekado |
| 2001/0038281 A1 | | 11/2001 | Nyce et al. |
| 2002/0135360 A1 | * | 9/2002 | Matsukawa et al. ... 324/207.25 |
| 2003/0137291 A1 | * | 7/2003 | Wendel et al. .......... 324/207.2 |
| 2004/0017186 A1 | * | 1/2004 | Viola ...................... 324/207.2 |

* cited by examiner

*Primary Examiner*—Bot Ledynh
*Assistant Examiner*—Kenneth J. Whittington
(74) *Attorney, Agent, or Firm*—Krieg DeVault LLP (57) ABSTRACT

A position sensor including a magnetic circuit comprising a magnet having opposite first and second magnetic poles, a first pole piece having a proximal portion positioned adjacent the first magnetic pole and a distal portion positioned adjacent the second magnetic pole to define a first air gap area with a first magnetic field provided adjacent thereto, and a second pole piece having a proximal portion positioned adjacent the second magnetic pole and a distal portion positioned adjacent the first magnetic pole to define a second air gap area with a second magnetic field provided adjacent thereto. A first magnetic flux sensor is disposed within the first magnetic field to sense varying magnitudes of magnetic flux density and to generate a first output signal. A second magnetic flux sensor is disposed within the second magnetic field to sense varying magnitudes of magnetic flux density and to generate a second output signal.

39 Claims, 4 Drawing Sheets

MAGNETIC POSITION SENSOR HAVING DUAL ELECTRONIC OUTPUTS

FIELD OF THE INVENTION

The present invention relates generally to the field of magnetic position sensors, and more particularly relates to a magnetic position sensor having dual electronic outputs.

BACKGROUND OF THE INVENTION

Magnetic position sensors are devices that generate a change in electronic signal output that is indicative of the relative movement of a mechanical component, such as, for example, a control shaft or rotor plate in the case of rotational position sensors or a carrier mechanism or linkage in the case of linear position sensors. In some instances, the change in electronic signal output is achieved without physical contact between the magnetic sensor circuit and the magnetic sensing element. These types of sensors are typically referred to in the industry as non-contacting magnetic position sensors.

With regard to non-contacting magnetic position sensors, one or more magnets may be used to generate a magnetic field having a magnetic field strength or flux density that varies as a function of the linear or rotational position of the mechanical component being monitored. The magnitude of the magnetic field strength is measured by an appropriate measuring device or detector, such as, for example, a Hall-effect element or magneto-resistive element. The value of the measured field intensity is translated through the measuring device to a voltage or current value that is uniquely representative of the relative rotational or linear position of the mechanical component being monitored. The electronic signal output provided by the magnetic position sensor is preferably a substantially linear representation of the relative rotational or linear position of the mechanical component being monitored. In addition to providing a substantially linear electronic signal output, minimizing hysteresis is also a desirable feature in most magnetic sensor applications.

In certain applications of magnetic position sensors, it is desirable to provide two redundant electronic output signals that are representative of the relative rotational or linear position of the mechanical component being monitored. For example, redundant electronic output signals are sometimes used in the automotive and transportation industries to monitor the status and position of critical systems or components. The redundant electronic signal outputs may be used to provide a back-up in the event that one of the signal outputs fails or becomes unreliable and/or may be used to provide verification or confirmation as to the accuracy and precision of the signal outputs.

In the past, attempts have been made to co-locate two measuring devices or detectors at the same position within a single magnetic field in an attempt to obtain identical electronic signal outputs. However, as should be appreciated, positioning of the measuring devices at precisely the same physical location is impossible. As a result, some differential is inherently present in the electronic signal outputs generated by the measuring devices.

Size and cost are usually a priority in magnetic position sensor designs, particularly in applications involving the automotive and transportation industries. For these applications, a compact magnetic circuit design that can be applied to a wide variety of applications and physical configurations, as well as maintaining a degree of simplicity that will be reflected in a reduced sensor cost, is desirable. Additionally, performance can not be compromised, and the ability to provide a relatively compact and inexpensive magnetic position sensor with good linearity and hysteresis characteristics is desirable.

Thus, there is a general need in the industry to provide an improved magnetic position sensor having dual electronic outputs. The present invention meets this need and provides other benefits and advantages in a novel and unobvious manner.

SUMMARY OF THE INVENTION

The present invention relates generally to an improved magnetic position sensor having dual electronic outputs. While the actual nature of the invention covered herein can only be determined with reference to the claims appended hereto, certain forms of the invention that are characteristic of the preferred embodiments disclosed herein are described briefly as follows.

In one form of the present invention, a magnetic position sensor is provided, including a magnet having opposite first and second magnetic pole surfaces, a first pole piece adjoined to the first magnetic pole to provide a first magnetic field, a second pole piece adjoined to the second magnetic pole surface to provide a second magnetic field, a first magnetic flux sensor disposed within the first magnetic field to sense varying magnitudes of magnetic flux density and to generate a first output signal, and a second magnetic flux sensor disposed within the second magnetic field to sense varying magnitudes of magnetic flux density and to generate a second output signal.

In another form of the present invention, a magnetic position sensor is provided, including a magnet having opposite first and second magnetic poles, a first pole piece having a proximal portion positioned adjacent the first magnetic pole and a distal portion positioned adjacent the second magnetic pole to define a first air gap area with a first magnetic field provided adjacent the first air gap area, a second pole piece having a proximal portion positioned adjacent the second magnetic pole and a distal portion positioned adjacent the first magnetic pole to define a second air gap area with a second magnetic field provided adjacent the second air gap, a first magnetic flux sensor disposed within the first magnetic field to sense varying magnitudes of magnetic flux density and to generate a first output signal, and a second magnetic flux sensor disposed within the second magnetic field to sense varying magnitudes of magnetic flux density and to generate a second output signal.

In a further form of the present invention, a magnetic position sensor is provided, including a magnet positioned along a rotational axis and polarized in a direction of magnetization arranged substantially perpendicular to the rotational axis, a first pole piece cooperating with the magnet to provide a first magnetic field, a second pole piece cooperating with the magnet to provide a second magnetic field, a first magnetic flux sensor disposed within the first magnetic field to sense varying magnitudes of magnetic flux density, and a second magnetic flux sensor disposed within the second magnetic field to sense varying magnitudes of magnetic flux density and to generate a second output signal.

It is one object of the present invention to provide an improved magnetic position sensor having dual electronic outputs. Further objects, features, advantages, benefits, and further aspects of the present invention will become apparent from the drawings and description set forth herein.

DESCRIPTION OF THE ILLUSTRATED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is hereby intended, such alterations and further modifications in the illustrated devices, and such further applications of the principles of the invention as illustrated herein being contemplated as would normally occur to one skilled in the art to which the invention relates.

Figure 1:
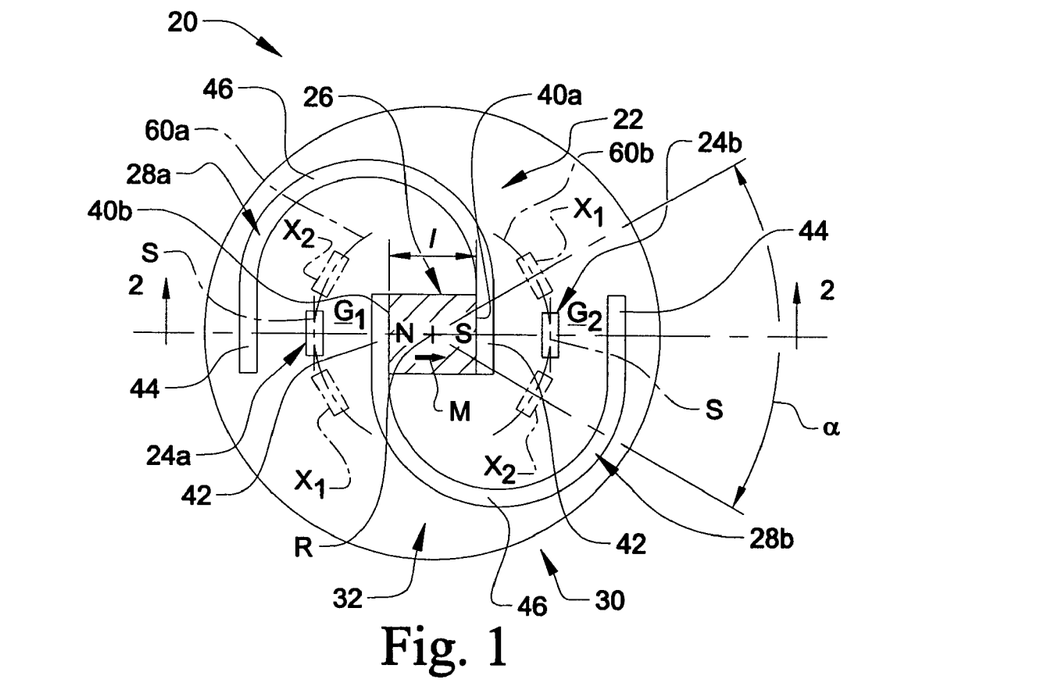
FIG. 1 is a top plan view of a magnetic position sensor according to one form of the present invention.
Figure 2:
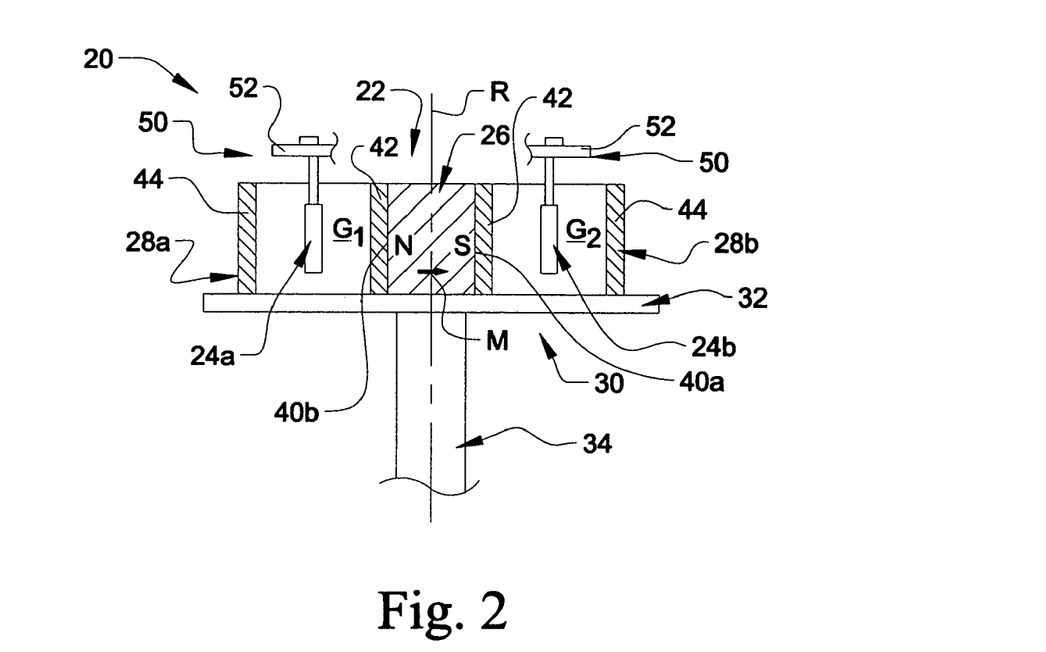
FIG. 2 is a partial cross sectional view of the magnetic position sensor illustrated in FIG. 1, as taken along line 2—2 of FIG. 1.

Referring to FIGS. 1 and 2, shown therein is a magnetic position sensor 20 according to one form of the present invention. The magnetic position sensor 20 is generally comprised of a magnetic circuit 22 and a pair of magnetic flux sensors 24a and 24b. The magnetic circuit 22 is configured to provide a pair of separate and preferably substantially identical magnetic fields. In the illustrated embodiment of the invention, the magnetic circuit 22 is generally comprised of a magnet 26 and a pair of shaped pole pieces 28a and 28b. The magnetic flux sensors 24a and 24b are configured to sense varying magnitudes of magnetic flux density associated with the respective magnetic fields as the magnetic circuit 22 is rotated about a rotational axis R, and to generate dual electronic output signals representative of the relative positions of the magnetic flux sensors 24a and 24b. In a preferred embodiment of the invention, the dual electronic output signals generated by the magnetic flux sensors 24a and 24b are substantially equal so as to provide a redundant pair of electronic output signals.

In the illustrated embodiment of the invention, the position sensor 20 includes a rotor assembly 30 to which the magnetic circuit 22 is adjoined such that rotational movement of the rotor assembly 30 correspondingly rotates the magnetic circuit 22 about the rotational axis R. In one embodiment, the rotor assembly 30 includes a base plate portion 32 to which the magnetic circuit 22 is adjoined, and a shaft portion 34 extending from the base plate portion 32.

The base plate portion 32 is preferably formed of a non-magnetically conductive material, such as, for example, a plastic material, a polymer or a composite material; however, other materials are also contemplated. The shaft portion 34 is operatively coupled to the mechanical component being monitored by the magnetic position sensor 20, the details of which would be apparent to one of skill in the art. Although a specific rotor configuration has been illustrated and described herein, it should be understood that other types and configurations of rotors are also contemplated for use in association with the present invention, the details of which would be apparent to one of skill in the art. It should also be understood that in other embodiments of the invention, the magnetic circuit 22 may be coupled directly to the mechanical component being monitored, thereby eliminating the need for a rotor assembly 30.

In one embodiment of the invention, the rotor assembly 30 is coupled to an electronic throttle pedal or throttle plate (not shown) in such a manner that rotational movement of the electronic throttle pedal or plate correspondingly rotates the magnetic circuit 22 about the rotational axis R. As discussed above, the magnetic flux sensors 24a and 24b sense varying magnitudes of magnetic flux density as the magnetic circuit 22 is rotated about the rotational axis R, and in turn generate a pair of redundant electronic output signals that are representative of the position of the magnetic flux sensors 24a and 24b relative to the magnetic circuit 22. Notably, the relative rotational position of the magnetic circuit 22 corresponds to the rotational position of the electronic throttle pedal or plate. As a result, the pair of redundant electronic output signals are also representative of the rotational position of the electronic throttle pedal or plate.

Redundant electronic output signals are particularly desirable when dealing with systems or devices having negative or severe safety implications if a single electronic output signal should become unreliable or fail. Although the magnetic position sensor 20 has been described for use in association with a particular application involving the automotive or transportation industry, it should be understood that other applications are also contemplated. Notably, the magnetic position sensor 20 may be used in association with any sensor application requiring dual electronic signal outputs.

Additionally, although the magnetic position sensor 20 illustrated and described herein is configured as a rotary position sensor, it should be understood that the magnetic position sensor 20 may alternatively be configured for use in association with other type of sensors, such as, for example, linear position sensors. As should be appreciated, in linear sensor applications, movement of the magnetic flux sensors 24a, 24b relative to the magnetic circuit 22 would occur along a transverse axis (not shown) as opposed to rotational movement about the rotational axis R.

Moreover, although not specifically illustrated and described herein, it should be understood that the magnetic position sensor 20 may be enclosed within an outer housing to protect the magnetic circuit 22 and the magnetic flux sensors 24a and 24b from the surrounding environment and/or to provide a means for mounting the position sensor 20 to a suitable structure or substrate. The details regarding the inclusion of a sensor housing would be apparent to one of skill in the art, and therefore need not be specifically discussed herein. It should also be understood that the magnetic flux sensors 24a, 24b may be secured in position relative to the magnetic circuit 22 via a mounting bracket or may be coupled directly to an electronic printed circuit board, further details of which will be discussed below. An outer stationary pole piece may also be provided to shield the magnetic circuit 22 and the magnetic flux sensors 24a, 24b from adjacent magnetic fields. Additionally, it should further be understood that other elements, components and devices may also be used in association with the magnetic position sensor 20, the likes of which would be apparent to one of skill in the art.

In the illustrated embodiment of the magnetic circuit 22, the magnet 26 has a generally rectangular or linear configuration. This particular configuration of magnet is relatively common, thereby tending to increase sourcing opportunities and reduce the overall cost of magnetic circuit 22. However, it should be understood that other shapes and configurations of the magnet 26 are also contemplated as falling within the scope of the present invention. For example, in other embodiments of the invention, the magnet 26 may define an irregular or non-rectangular configuration, an angled configuration, a curved or arcuate configuration, a cylindrical configuration, a circular configuration, a ring configuration, an arc configuration, or any other shape or configuration that would occur to one of skill in the art. It should be understood that the geometric dimensions of the magnet 26 are dictated by the size and configuration of the position sensor 20 and/or the type and material makeup of the magnet 26.

The magnet 26 may utilize a wide range of magnet materials and/or forming techniques to balance size and cost considerations. In one embodiment of the invention, the magnet 26 is a rare earth magnet. In a further embodiment, the magnet 26 is injection molded and is substantially void of any magnetic flux density hot spots. However, it should be understood that other types of magnets having different operational characteristics, material compositions and/or methods of manufacture are also contemplated for use in association with the present invention. For example, electromagnets may alternatively be used as a means to generate the magnetic fields, the details of which would be apparent to one of skill in the art. Additionally, although the magnet 26 is illustrated as being formed as a single piece, it should be understood that the magnet 26 could alternatively be comprised of multiple portions positioned adjacent one another to form an integral magnet strip or block.

As illustrated in FIG. 1, the north and south magnetic poles N, S of the magnet 26 are arranged so as to polarize the magnet 26 in a direction of magnetization M extending along a length l of the magnet 26. In one embodiment of the invention, the magnetic poles N, S of the magnet 26 are defined by opposite magnetic pole surfaces 40a, 40b. In another embodiment of the invention, the magnetic pole surfaces 40a, 40b are substantially planar to facilitate attachment of the pole pieces 28a, 28b thereto, the details of which will be discussed below. However, it should be understood that other magnetic polarization arrangements and/or other shapes and configurations of the magnetic pole surfaces 40a, 40b are also contemplated as falling within the scope of the present invention. In a further embodiment of the invention, the magnet 26 is positioned generally along the rotational axis R and oriented so as to arrange the direction of magnetization M substantially perpendicular to the rotational axis R. In a specific embodiment, the rotational axis R extends through a central portion of the magnet 26 so as to centrally position the magnet 26 relative to the remainder of the magnetic circuit 22 and the rotational axis R. However, it should be understood that other positions and orientations of the magnet 26 relative to the rotational axis R are also contemplated as falling within the scope of the present invention.

The pole pieces 28a, 28b are preferably formed of a magnetically permeable material, such as, for example, a soft magnetic steel or cold rolled steel. However, it should be understood that other suitable magnetically permeable materials are also contemplated for use in association with the present invention. For example, in alternative embodiments of the invention, the pole pieces 28a, 28b may be at least partially formed of a material having a magnetic reluctance different from that of iron or cold rolled steel. In one such embodiment, the pole pieces 28a, 28b may be at least partially formed of a ferrite material. In another embodiment, the pole pieces 28a, 28b may be at least partially formed of a plastic or polymer material, such as, for example, a nylon material. In yet another embodiment, the pole pieces 28a, 28b may be formed of a composite material comprised of a non-magnetic material and a magnetizable filler material, such as, for example Nylon 6/6. Further details regarding the use of alternative materials to form the pole pieces 28a, 28b may be found in U.S. Pat. No. 6,586,929 to Luetzow, the contents of which are hereby incorporated by reference in their entirety.

As illustrated in FIG. 1, in one embodiment of the invention, the pole pieces 28a, 28b have a substantially identical shape and configuration. Therefore, like features of the pole pieces 28a, 28b will be referred to using the same reference numerals. The pole piece 28a cooperates with the magnet 26 to provide a first magnetic field within which the magnetic flux sensor 24a is positioned. Similarly, the pole piece 28b cooperates with the magnet 26 to provide a second magnetic field within which the magnetic flux sensor 24b is positioned. Further details regarding the relationship between the magnetic fields provided by the magnetic circuit 22 and the magnetic flux sensors 24a, 24b will be illustrated and described in greater detail below.

Each of the pole pieces 28a, 28b includes a proximal portion 42 positioned adjacent the magnet 26, a distal portion 44 and an intermediate portion 46. In a preferred embodiment of the invention, the proximal portions 42 of the pole pieces 28a, 28b are adjoined to the magnetic pole surfaces 40a, 40b of the magnet 26, respectively. For purposes of the present invention, the term "adjoined" is broadly defined as a unitary fabrication, a permanent affixation, a detachable coupling, a continuous engagement or a contiguous disposal of the pole pieces 28a, 28b relative to the magnet 26. In a specific embodiment, the proximal portions 42 of the pole pieces 28a, 28b are affixed to the magnetic pole surfaces 40a, 40b of the magnet 26 by a bonding agent, such as, for example, an adhesive material or a plastic bond. However, other methods of affixation are also contemplated for use in association with the present invention, such as, for example, welding, fastening, clamping or any other method of affixation that would occur to one of skill in the art. In a further embodiment of the invention, the proximal portions 42 of the pole pieces 28a, 28b are configured to substantially match the corresponding outer contour or profile of the magnetic pole surfaces 40a, 40b of the magnet 26 so as to provide a relatively close-fitting interface therebetween.

As illustrated in FIG. 1, in one embodiment of the invention, the pole piece 28a is shaped and configured such that the proximal portion 42 is positioned adjacent one of the magnetic poles (e.g., the south pole S), with the distal portion 44 positioned adjacent the opposite magnetic pole (e.g., the north pole N) to define a first air gap area $G_1$, with the pole piece 28a cooperating with the magnet 26 to provide a first magnetic field adjacent the first air gap area $G_1$. Similarly, the pole piece 28b is shaped and configured such that the proximal portion 42 is positioned adjacent one of the magnetic poles (e.g., the north pole N), with the distal portion 44 positioned adjacent the opposite magnetic pole (e.g., the south pole S) to define a second air gap area $G_2$, with the pole piece 28b cooperating with the magnet 26 to provide a second magnetic field adjacent the second air gap area $G_2$.

In a specific embodiment of the invention, the distal portion 44 of the pole piece 28a laterally overlaps at least a portion of the magnetic pole surface 40b to define at least a portion of the first air gap area $G_1$, with the distal portion 44 of the pole piece 28b laterally overlapping at least a portion of the magnetic pole surface 40a to define at least a portion of the second air gap area $G_2$. In a further embodiment of the invention, the distal portion 44 of the pole piece 28a is arranged substantially parallel to the magnetic pole surface 40b, and with the distal portion 44 of the pole piece 28b arranged substantially parallel to the magnetic pole surface 40a. However, it should be understood that alternative arrangements and orientations of the pole pieces 28a, 28b relative to the magnet 26 are also contemplated.

As illustrated in FIG. 1, in one embodiment of the invention, the pole pieces 28a, 28b have a substantially arcuate configuration. Specifically, the pole pieces 28a, 28b are illustrated as having a U-shaped or horseshoe-shaped configuration, with the proximal and distal end portions 42, 44 defining substantially parallel leg portions extending from an arcuate-shaped intermediate portion 46. In one embodiment, the intermediate portion 46 comprises an arc segment having a semi-annular configuration extending circumferentially about approximately 180 degrees. However, it should be understood that the pole pieces 28a, 28b need not necessarily define a semi-annular configuration, but may alternatively extend about greater than or less than a 180 degree arc segment. As also illustrated in FIG. 1, the arcuate-shaped intermediate portions 46 of the pole pieces 28a, 28b are offset from the rotational axis R and from one another so as to define non-concentric arc segments.

It should be appreciated that a variety of different shapes and configurations of the pole piece 28a, 28b are contemplated for use in association with the present invention, including other arcuate configurations such as semi-circular, semi-elliptical or curvilinear configurations, various types of rectangular or rectilinear configurations, and/or various types of angular or polygonal configurations. Several alternative embodiments of pole pieces will now be illustrated and described, it being understood that these alternative embodiments are exemplary and do not in any way limit the scope and breadth of the present invention.

Figure 4:
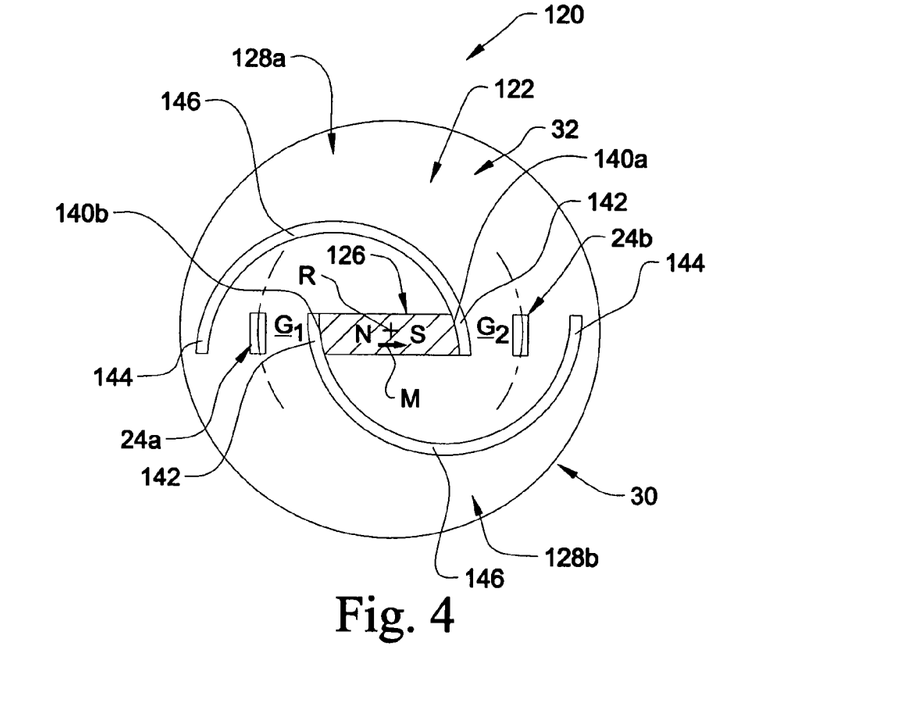
FIG. 4 is a top plan view of a magnetic position sensor according to another embodiment of the present invention.

As illustrated in FIG. 4, the magnetic position sensor 120 generally comprises a magnetic circuit 122 and a pair of magnetic flux sensors 24a, 24b, with the magnetic circuit 122 including a magnet 126 having magnetic pole surfaces 140a, 140b, and a pair of arc-shaped pole pieces 128a, 128b each having a semi-circular configuration. The arc-shaped pole pieces 128a, 128b each include proximal and distal portions 142, 144 and an intermediate portion 146 that cooperate to define a continuous arc-segment. In this embodiment of the invention, the magnetic pole surfaces 140a, 140b defined by the magnet 126 may be curved or rounded to more closely correspond to the arc-shaped proximal portions 142 of the pole pieces 128a, 128b. Similar to the pole pieces 28a, 28b illustrated and described above, the pole pieces 128a, 128b need not necessarily define a semi-circular configuration, but may alternatively extend about greater than or less than a 180 degree arc segment.

Figure 5:
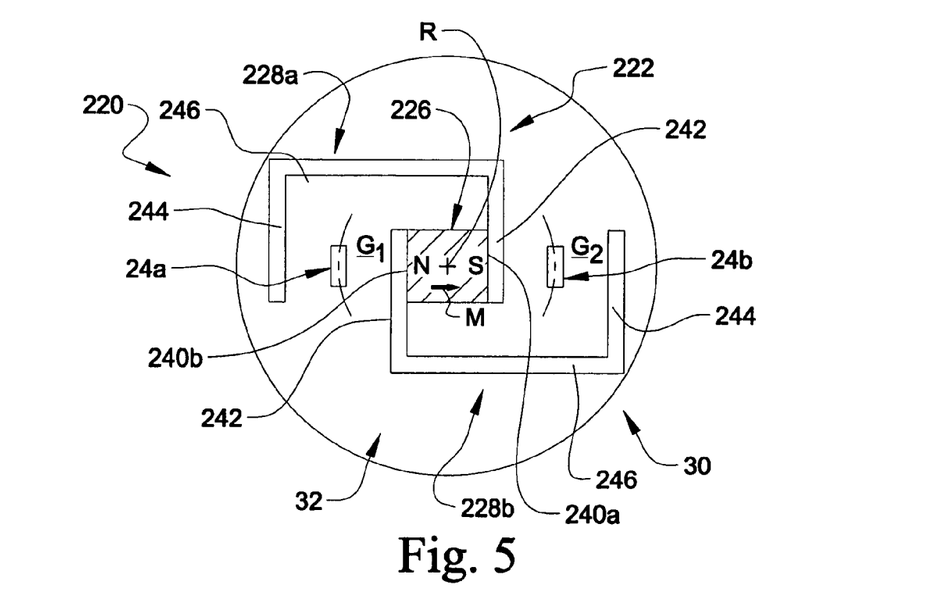
FIG. 5 is a top plan view of a magnetic position sensor according to a further embodiment of the present invention.

Referring to FIG. 5, the magnetic position sensor 220 generally comprises a magnetic circuit 222 and a pair of magnetic flux sensors 24a, 24b, with the magnetic circuit 222 including a magnet 226 having magnetic pole surfaces 240a, 240b, and a pair of pole pieces 228a, 228b each having a semi-rectangular configuration. The pole pieces 228a, 228b each include proximal and distal portions 242, 244 and an intermediate portion 246 that define substantially linear pole piece segments. In other embodiments of the invention, the pole pieces 228a, 228b may define other rectangular or rectilinear configurations and/or angular or polygonal configurations.

Figure 6:
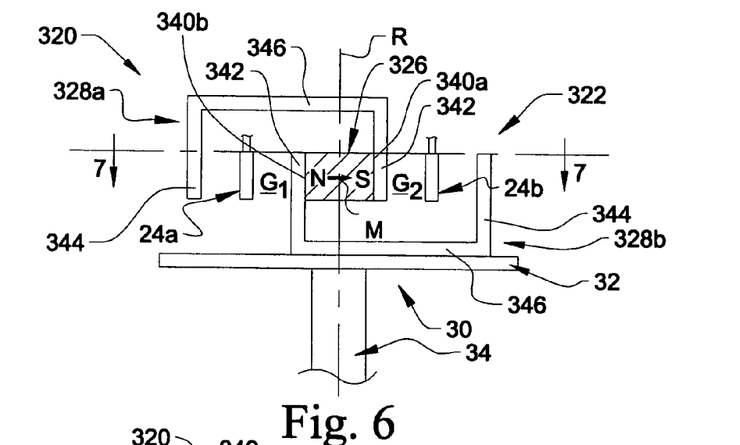
FIG. 6 is a side elevational view of a magnetic position sensor according to still another embodiment of the present invention.
Figure 7:
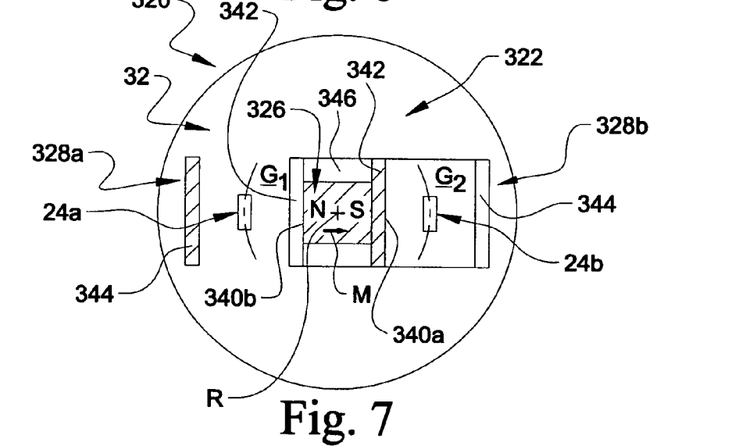
FIG. 7 is a partial cross sectional view of the magnetic position sensor illustrated in FIG. 6, as taken along line 7—7 of FIG. 6.

Referring to FIGS. 6 and 7, illustrated therein is a magnetic position sensor 320 according to yet another embodiment of the invention. In many respects, the magnetic position sensor 320 is similar to that of position sensor 220, generally comprising a magnetic circuit 322 and a pair of magnetic flux sensors 24a, 24b, with the magnetic circuit 322 including a magnet 326 having magnetic pole surfaces 340a, 340b, and a pair of pole pieces 328a, 328b each having a semi-rectangular configuration. The pole pieces 328a, 328b each include proximal and distal portions 342, 344 and an intermediate portion 346 that define substantially linear pole piece segments. However, the pole pieces 328a, 328b are rotated 90° relative to the pole pieces 228a, 228b of position sensor 220 such that the proximal and distal portions 342, 344 extend from the intermediate portion 346 in a direction substantially parallel with the rotational axis R. However, aside from the alternative arrangement/orientation of the pole pieces 328a, 328b, the operating principles of the position sensor 320 are very similar to those of the position sensor 220.

Figure 8:
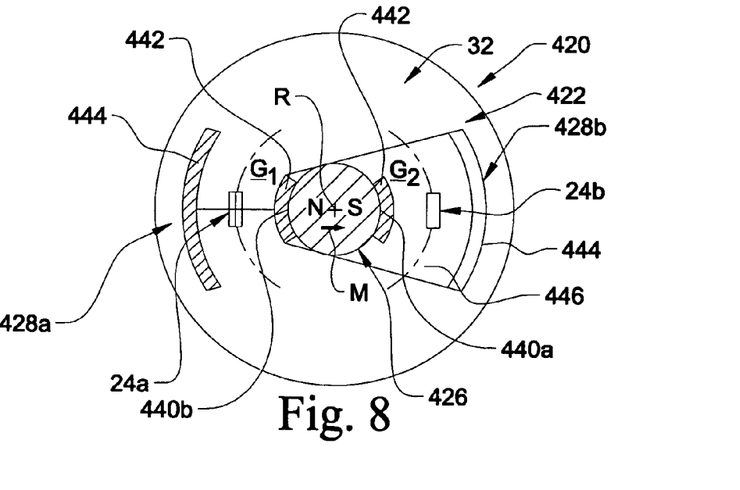
FIG. 8 is a partial cross sectional view of a magnetic position sensor according to another embodiment of the present invention.

Referring to FIG. 8, illustrated therein is a magnetic position sensor 420 according to still another embodiment of the invention. The magnetic position sensor 420 is similar to that of position sensor 320, generally comprising a magnetic circuit 422 and a pair of magnetic flux sensors 24a, 24b, with the magnetic circuit 422 including a magnet 426 having magnetic pole surfaces 440a, 440b, and a pair of pole pieces 428a, 428b. However, unlike the rectangular-shaped magnet 326, the magnet 426 has a circular or disc-like configuration. Additionally, the pole pieces 428a, 428b do not have a true rectangular configuration. Instead, the pole pieces 428a, 428b each include proximal and distal portions 442, 444 having an arc-shaped axial profile. More specifically, the proximal portions 442 of the pole pieces 428, 428b are curved to substantially correspond to the outer circumferential surface of the disc-shaped magnet 426. Additionally, the distal portions 444 of the pole pieces 428, 428b are curved to substantially correspond to the profile of the sensing paths along which the magnetic flux sensors 24a, 24b are displaced relative to the magnetic circuit 422. However, aside from the alternative configurations of the magnet 426 and the pole pieces 428a, 428b, the operating principles of the position sensor 420 are very similar to those of the position sensor 320.

Referring once again to FIGS. 1 and 2, as discussed above, the pole piece 28a cooperates with the magnet 26 to provide a first magnetic field adjacent the first air gap area $G_1$. Similarly, the pole piece 28b cooperates with the magnet 26 to provide a second magnetic field adjacent the second air gap area $G_2$. In a preferred embodiment of the invention, the pole pieces 28a, 28b cooperate with the magnet 26 to provide substantially identical first and second magnetic fields adjacent the respective air gap areas $G_1$, $G_2$. However, it should be understood that in other embodiments of the invention, the first and second magnetic fields provided by the magnetic circuit 22 may differ.

The magnetic flux sensor 24a is positioned within the first magnetic field associated with the air gap area $G_1$ and is operable to sense variations in magnetic flux density associated with the first magnetic field and to generate a first electronic output signal that is representative of the position of the magnetic flux sensor 24a relative to the first magnetic field. Similarly, the magnetic flux sensor 24b is positioned within the second magnetic field associated with the air gap area $G_2$ and is operable to sense variations in magnetic flux density associated with the second magnetic field and to generate a second electronic output signal that is representative of the position of the magnetic flux sensor 24a relative to the first magnetic field. In a preferred embodiment of the invention, the electronic output signals generated by the magnetic flux sensors 24a, 24b are substantially equal, thereby providing redundant electronic output signals that are uniquely representative of the instantaneous operational position of the magnetic circuit 22, and more particularly the instantaneous operational position of the mechanical component being monitored by the position sensor 20.

For purposes of the present invention, a "magnetic flux sensor" is broadly defined as any device that is operable to sense magnetic flux density and to generate an electronic signal representative of the magnitude of the magnetic flux density. In one embodiment of the invention, the magnetic flux sensors 24a, 24b are Hall effect devices capable of sensing magnetic flux density passing perpendicularly through the sensing plane S. Preferably, the Hall-effect devices are of the programmable type; however, non-programmable Hall-effect devices are also contemplated for use in association with the present invention. It should also be understood that other types of magnetic flux sensors are also contemplated for use in association with the present invention, such as, for example, a magneto-resistive (MR) sensor, a magnetic diode sensor, or any other magnetic field-sensitive sensor device that would occur to one of skill in the art. Use of an MR-type magnetic flux sensor may be particularly advantageous in sensor applications where the thermal operating environment exceeds 160 degrees Celsius.

As would be appreciated by those of skill in the art, the functionality of a Hall-effect device is based on the physical principle that a voltage is generated transverse to the current flow direction in an electric conductor if a magnetic field is applied perpendicularly in a direction normal to the conductor. Typically, a Hall element is a small platelet that is formed of a semi-conductive material. In operation, the Hall element detects the magnitude of magnetic flux density passing through the Hall plate in a direction perpendicular to the surface of the Hall plate, and generates an output signal that is representative of the sensed magnitude of magnetic flux density. Preferably, the output signal is a voltage signal; however, other types of electronic output signals are also possible. Further details regarding the characteristics and operation of magnetic flux sensors, and particularly a Hall-effect type magnetic flux sensor, are disclosed in U.S. Pat. No. 6,137,288 to Luetzow, the contents of which are incorporated herein in their entirety.

In one embodiment of the invention, the magnetic flux sensors 24a, 24b are operably coupled to a carrier mechanism 50 (FIG. 2). In a further embodiment of the invention, the carrier mechanism 50 may include an integral printed circuit board 52 containing the electronic circuitry to which the magnetic flux sensors 24a, 24b are electrically connected. In a specific embodiment, the electronic circuitry of the magnetic flux sensors 24a, 24b is integrated onto a silicon chip using CMOS technology. It should be understood, however, that other types and configurations of carrier mechanisms are also contemplated for use in association with the magnetic flux sensors 24a, 24b. It should also be understood the magnetic flux sensors 24a, 24b may be operably coupled to a common carrier mechanism 50 and/or electrically connected to a common printed circuit board 52, or may alternatively be operably coupled to separate carrier mechanisms 50 and/or electrically connected to separate printed circuit boards 52.

Preferably, the magnetic circuit 22 is rotated about the rotational axis R while the magnetic flux sensors 24a, 24b remain stationary. However, it should be understood that in other embodiments of the invention, the magnetic flux sensors 24a, 24b may be rotated about rotational axis R while the magnetic circuit 22 remains stationary, or that the magnetic circuit 22 and the magnetic flux sensors 24a, 24b may both be rotated about a rotational axis R at different rates and/or in different directions. Mechanisms for providing such relative displacement between the magnetic flux sensors 24a, 24b and the magnetic circuit 22 are well known to those skilled in the art and therefore need not be discussed herein. Such mechanisms may include, for example, various types of linkages, carriers, brackets, rotor assemblies and/or shafts.

Having described the various structural features associated with the magnetic position sensor 20, reference will now be made to operation of the magnetic position sensor 20 according to one form of the present invention. Illustrated in FIG. 1 are three operational positions for each of the magnetic flux sensors 24a, 24b relative to the magnetic circuit 22, with the central positions shown in solid and the extreme end positions shown in phantom. Although the overall rotational displacement angle $\alpha$ of the magnetic flux sensors 24a, 24b along the sensing paths 60a, 60b between the extreme operational positions is illustrated as being approximately 60°, it should be understood that the magnetic position sensor 20 may be configured to accommodate rotational displacement angles a greater than or less than 60°.

As should be appreciated, the magnetic flux sensors 24a, 24b will sense varying magnitudes of magnetic flux density along sensing paths 60a, 60b, respectively, as the magnetic circuit 22 is rotated about the rotational axis R. During such rotational movement, the sensing planes S of the magnetic flux sensors 24a, 24b will preferably continuously face toward the magnet 24 and the rotational axis R. When the magnetic flux sensors 24a, 24b are located at the operational end position $X_1$, the magnitude of the magnetic flux density passing through the sensing planes S will be at a minimum. However, as the magnetic flux sensors 24a, 24b are displaced through the corresponding first and second magnetic fields along the sensing paths 60a, 60b, toward the operational end position $X_2$, the magnitude of magnetic flux density passing through the sensing planes S correspondingly increases. It should be appreciated that the magnetic field strength or flux density detected by the magnetic flux sensors 24a, 24b is proportional to the relative angular position of magnetic flux sensors 24a, 24b along sensing paths 60a, 60b. In preferred embodiments of the invention, the sensed magnitude of the magnetic flux density varies in a substantially linear manner along the sensing paths 60a, 60b.

In response to variation in the sensed magnitude of magnetic flux density, the magnetic flux sensors 24a, 24b each generate an electronic voltage signal that is proportional to the sensed magnitude of magnetic flux density, which is in turn proportional to the relative angular position of the magnetic flux sensors 24a, 24b along the sensing paths 60a, 60b. In embodiments of the invention involving rotary-type position sensors, the electronic output signals generated by the magnetic flux sensors 24a, 24b are uniquely representative of the instantaneous rotational position of the magnetic flux sensors 24a, 24b relative to the first and second magnetic fields generated by the magnetic circuit 22.

Figure 3:
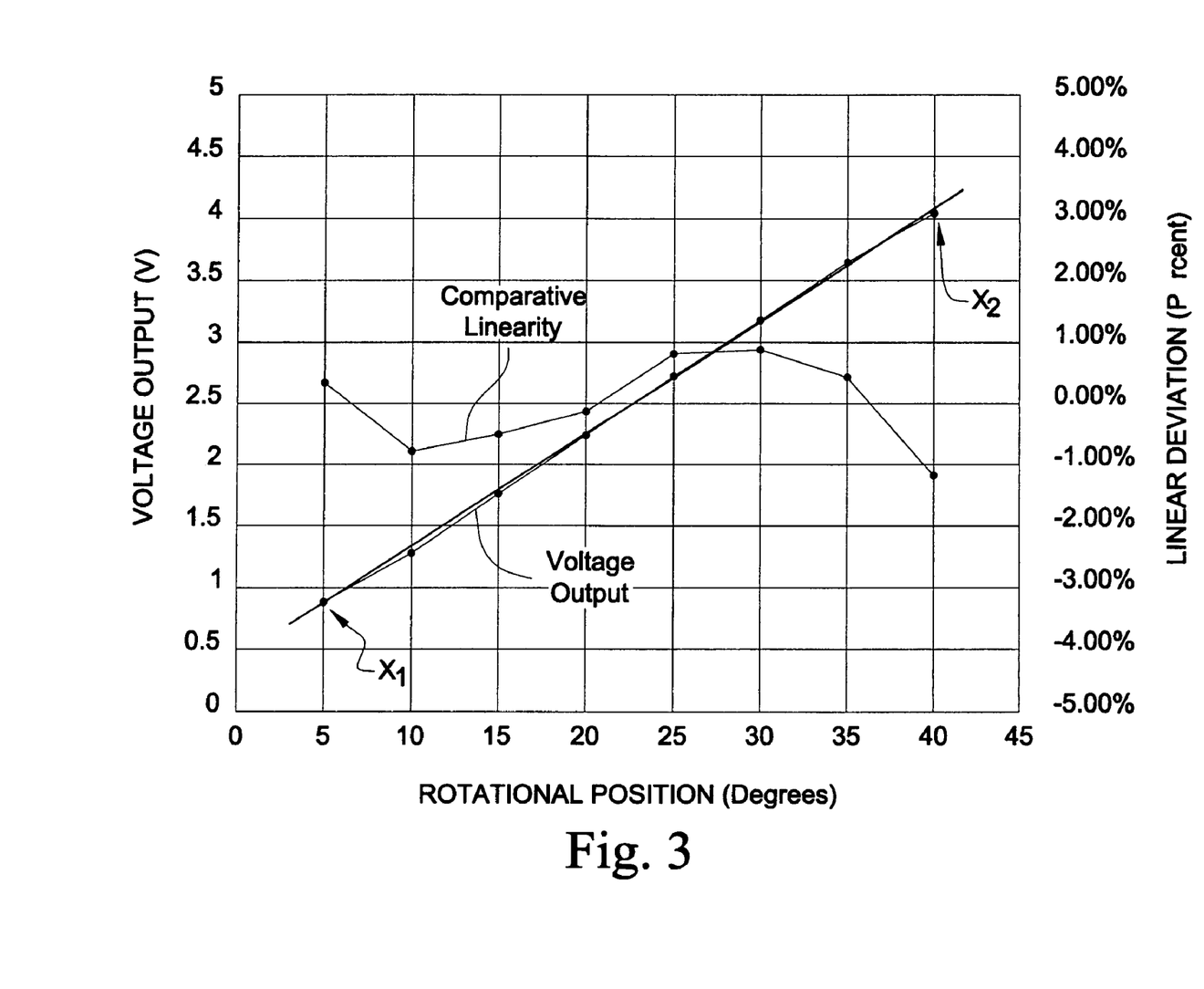
FIG. 3 is a graph illustrating the actual voltage output and the comparative linearity of the actual voltage output of the magnetic position sensor illustrated in FIG. 1 as a function of rotational position.

Referring to FIG. 3, shown therein is a graph depicting the output voltage of the magnetic flux sensors 24a, 24b as a function of the relative angular position of the magnetic flux sensors 24a, 24b along the sensing paths 60a, 60b. In a preferred embodiment of the invention, the voltage signal outputs generated by the magnetic flux sensors 24a, 24b vary in a substantially linear manner as the magnetic flux sensors 24a, 24b are relatively displaced along the sensing paths 60a, 60b. Although FIG. 3 illustrates the voltage signal outputs as being substantially linear throughout approximately 35° of rotational movement, it should be understood that other ranges of rotational movement that result in a linear variation of the voltage output signals are also contemplated as falling within the scope of the present invention. As also illustrated in FIG. 3, the voltage signal output of the magnetic flux sensors 24a, 24b preferably exhibits less than about +/−1% linear deviation relative to a best-fit straight line. Although auxiliary electronic circuitry may be used to compensate for any non-linear characteristics of the magnetic fields produced by the magnetic circuit sensor 22 and/or any non-linearity in the voltage output signals, post processing of the sensor output signal typically results in increased sensor costs and a possible decrease in sensor accuracy and reliability.

In the illustrated embodiment of the invention, the voltage signal outputs of the magnetic flux sensors 24a, 24b vary in a substantially linear manner between a minimum voltage output signal of about 0.75V and a maximum voltage output signal of about 4V. However, it should be understood that these particular voltage levels and ranges are exemplary, and that other levels and ranges of voltage output signals are also contemplated as falling within the scope of the present invention. It should also be understood that other types of signal outputs are also contemplated, such as, for example, a current signal output. It should additionally be understood that the voltage signal outputs may be passed through a programmable operational amplifier (not shown) to generate a final output voltage falling within a specified signal output range, the details of which would be known to those of skill in the art.

Although the illustrated embodiments of the invention utilize magnetic circuits having a single magnet and a pair of pole pieces, it should be understood that in other embodiments of the invention, two or more magnets and/or three or more pole pieces may be used to generate two or more magnetic fields, with each magnetic field having magnetic flux density that varies as a function of the relative position of the magnetic circuit. Additionally, although the illustrated embodiments of the invention depict the use of a pair of magnetic flux sensors, it should be understood that in other embodiments of the invention, three or more magnetic flux sensors may be used to sense varying magnitudes of magnetic flux density associated with the magnetic fields and to generate multiple output signals for applications requiring redundant signal outputs and/or multiple signal output profiles. Furthermore, although the magnetic position sensors illustrated and described herein are sized to accommodate a specific sensing range, it should be understood that the magnetic circuit can easily be scaled up or scaled down to accommodate other sensing ranges and/or to satisfy the particular operational requirements of the magnetic sensor.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A magnetic position sensor, comprising:
   a magnet having opposite first and second magnetic pole surfaces;
   a first pole piece adjoined to said first magnetic pole surface and cooperating with said magnet to provide a first magnetic field;
   a second pole piece adjoined to said second magnetic pole surface and cooperating with said magnet to provide a second magnetic field;
   a first magnetic flux sensor disposed within said first magnetic field and at least partially positioned between said magnet and a portion of said first pole piece, said first magnetic flux sensor operable to sense varying magnitudes of magnetic flux density and to generate a first output signal representative of a position of said first magnetic flux sensor relative to said first magnetic field; and
   a second magnetic flux sensor disposed within said second magnetic field and at least partially positioned between said magnet and a portion of said second pole piece, said second magnetic flux sensor operable to sense varying magnitudes of magnetic flux density and to generate a second output signal representative of a position of said second magnetic flux sensor relative to said second magnetic field.

2. The magnetic position sensor of claim 1, wherein said first pole piece has a proximal portion adjoined to said first magnetic pole surface and a distal portion positioned adjacent said second magnetic pole surface to define a first air gap area, said first pole piece cooperating with said magnet to provide said first magnetic field adjacent said first air gap area, said second pole piece having a proximal portion adjoined to said second magnetic pole surface and a distal portion positioned adjacent said first magnetic pole surface to define a second air gap area, said second pole piece cooperating with said magnet to provide said second magnetic field adjacent said second air gap area.

3. The magnetic position sensor of claim 2, wherein said first and second magnetic pole surfaces are substantially planar.

4. The magnetic position sensor of claim 2, wherein said magnet has a substantially rectangular configuration.

5. The magnetic position sensor of claim 2, wherein said distal portion of said first pole piece is arranged substantially parallel with said second magnetic pole surface, said distal portion of said second pole piece arranged substantially parallel with said first magnetic pole surface.

6. The magnetic position sensor of claim 1, wherein said magnet is positioned along a rotational axis, said first output signal being representative of a rotational position of said first magnetic flux sensor relative to said first magnetic field, said second output signal being representative of a rotational position of said second magnetic flux sensor relative to said second magnetic field.

7. The magnetic position sensor of claim 6, wherein said rotational axis extends through a central portion of said magnet.

8. The magnetic position sensor of claim 6, wherein said magnet defines a direction of magnetization between said first and second magnetic pole surfaces arranged substantially perpendicular to said rotational axis.

9. The magnetic position sensor of claim 1, wherein said first output signal is substantially equal to said second output signal.

10. The magnetic position sensor of claim 1, wherein said first and second magnetic flux sensors are Hall-effect sensors.

11. The magnetic position sensor of claim 1, wherein each of said first and second pole pieces has an arcuate configuration.

12. The magnetic position sensor of claim 1, wherein each of said first and second pole pieces at least partially comprises an arc segment.

13. The magnetic position sensor of claim 12, wherein said arc segments are non-concentric.

14. The magnetic position sensor of claim 12, wherein each of said first and second pole pieces has a semi-annular configuration.

15. The magnetic position sensor of claim 1, wherein each of said first and second pole pieces has a U-shaped configuration.

16. The magnetic position sensor of claim 1, wherein each of said first and second pole pieces has a rectilinear configuration.

17. The magnetic position sensor of claim 1, wherein said first magnetic field is substantially identical to said second magnetic field.

18. A magnetic position sensor, comprising:
a magnet having opposite first and second magnetic pole surfaces;
a first pole piece adjoined to said first magnetic pole surface and cooperating with said magnet to provide a first magnetic field, a distal portion of said first pole piece laterally overlapping at least a portion of said second magnetic pole surface;
a second pole piece adjoined to said second magnetic pole surface and cooperating with said magnet to provide a second magnetic field, a distal portion of said second pole piece laterally overlapping at least a portion of said first magnetic pole surface;
a first magnetic flux sensor disposed within said first magnetic field and operable to sense varying magnitudes of magnetic flux density and to generate a first output signal representative of a position of said first magnetic flux sensor relative to said first magnetic field; and
a second magnetic flux sensor disposed within said second magnetic field and operable to sense varying magnitudes of magnetic flux density and to generate a second output signal representative of a position of said second magnetic flux sensor relative to said second magnetic field.

19. The magnetic position sensor of claim 18, wherein said first and second magnetic pole surfaces are substantially planar.

20. A magnetic position sensor, comprising:
a magnet having opposite first and second magnetic poles;
a first pole piece having a proximal portion positioned adjacent said first magnetic pole and a distal portion positioned adjacent said second magnetic pole to define a first air gap area, said first pole piece cooperating with said magnet to provide a first magnetic field adjacent said first air gap area;
a second pole piece having a proximal portion positioned adjacent said second magnetic pole and a distal portion positioned adjacent said first magnetic pole to define a second air gap area, said second pole piece cooperating with said magnet to provide a second magnetic field adjacent said second air gap area;
a first magnetic flux sensor disposed within said first magnetic field and operable to sense varying magnitudes of magnetic flux density and to generate a first output signal representative of a position of said first magnetic flux sensor relative to said first magnetic field; and
a second magnetic flux sensor disposed within said second magnetic field and operable to sense varying magnitudes of magnetic flux density and to generate a second output signal representative of a position of said second magnetic flux sensor relative to said second magnetic field.

21. The magnetic position sensor of claim 20, wherein said magnet is positioned along a rotational axis, said first output signal being representative of a rotational position of said first magnetic flux sensor relative to said first magnetic field, said second output signal being representative of a rotational position of said second magnetic flux sensor relative to said second magnetic field.

22. The magnetic position sensor of claim 21, wherein said rotational axis extends through a central portion of said magnet.

23. The magnetic position sensor of claim 21, wherein said magnet defines a direction of magnetization between said first and second magnetic poles arranged substantially perpendicular to said rotational axis.

24. The magnetic position sensor of claim 20, wherein said magnet has opposite first and second magnetic pole surfaces, said distal portion of said first pole piece laterally overlapping at least a portion of said second magnetic pole surface to define said first air gap area, said distal portion of said second pole piece laterally overlapping at least a portion of said first magnetic pole surface to define said second air gap area.

25. The magnetic position sensor of claim 24, wherein said first and second magnetic pole surfaces are substantially planar.

26. The magnetic position sensor of claim 24, wherein said distal portion of said first pole piece is arranged substantially parallel with said second magnetic pole surface, said distal portion of said second pole piece arranged substantially parallel with said first magnetic pole surface.

27. The magnetic position sensor of claim 20, wherein said magnet has opposite first and second magnetic pole surfaces, said proximal portion of said first pole piece adjoined to said first magnetic pole surface, said proximal portion of said second pole piece adjoined to said second magnetic pole surface.

28. The magnetic position sensor of claim 20, wherein said first magnetic field is substantially identical to said second magnetic field.

29. The magnetic position sensor of claim 20, wherein said first output signal is substantially equal to said second output signal.

30. A magnetic position sensor, comprising:
a magnet positioned along a rotational axis and polarized in a direction of magnetization arranged substantially perpendicular to said rotational axis;

a first pole piece cooperating with said magnet to provide a first magnetic field;

a second pole piece cooperating with said magnet to provide a second magnetic field;

a first magnetic flux sensor disposed within said first magnetic field and operable to sense varying magnitudes of magnetic flux density and to generate a first output signal representative of a rotational position of said first magnetic flux sensor relative to said first magnetic field; and a second magnetic flux sensor disposed within said second magnetic field and operable to sense varying magnitudes of magnetic flux density and to generate a second output signal representative of a rotational position of said second magnetic flux sensor relative to said second magnetic field;

said magnet having opposite first and second magnetic poles, said first pole piece having a proximal portion positioned adjacent said first magnetic pole and a distal portion positioned adjacent said second magnetic pole to define a first air gap area, said first pole piece cooperating with said magnet to provide said first magnetic field adjacent said first air gap area; and said second pole piece having a proximal portion positioned adjacent said second magnetic pole and a distal portion positioned adjacent said first magnetic pole to define a second air gap area, said second pole piece cooperating with said magnet to provide said second magnetic field adjacent said second air gap area.

31. The magnetic position sensor of claim 30, wherein said rotational axis extends through a central portion of said magnet.

32. The magnetic position sensor of claim 30, wherein said first output signal is substantially equal to said second output signal.

33. The magnetic position sensor of claim 30, wherein said magnet has opposite first and second magnetic pole surfaces, said distal portion of said first pole piece laterally overlapping at least a portion of said second magnetic pole surface to define said first air gap area, said distal portion of said second pole piece laterally overlapping at least a portion of said first magnetic pole surface to define said second air gap area.

34. The magnetic position sensor of claim 30, wherein said magnet has opposite first and second magnetic pole surfaces, said distal portion of said first pole piece arranged substantially parallel with said second magnetic pole surface, said distal portion of said second pole piece arranged substantially parallel with said first magnetic pole surface.

35. The magnetic position sensor of claim 30, wherein said magnet has opposite first and second magnetic pole surfaces, said proximal portion of said first pole piece adjoined to said first magnetic pole surface, said proximal portion of said second pole piece adjoined to said second magnetic pole surface.

36. The magnetic position sensor of claim 30, wherein each of said first and second pole pieces at least partially comprises an arc segment.

37. The magnetic position sensor of claim 36, wherein said arc segments are non-concentric.

38. The magnetic position sensor of claim 30, wherein each of said first and second pole pieces has a U-shaped configuration.

39. The magnetic position sensor of claim 30, wherein said first magnetic field is substantially identical to said second magnetic field.

* * * * *